United States Patent
Kitamura

(10) Patent No.: US 11,825,046 B2
(45) Date of Patent: Nov. 21, 2023

(54) INFORMATION PROCESSING SYSTEM, IMAGE FORMING APPARATUS, AND NON-TRANSITORY RECORDING MEDIUM

(71) Applicant: Takashi Kitamura, Kanagawa (JP)

(72) Inventor: Takashi Kitamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/821,236

(22) Filed: Aug. 22, 2022

(65) Prior Publication Data
US 2023/0083109 A1 Mar. 16, 2023

(30) Foreign Application Priority Data
Sep. 14, 2021 (JP) ................. 2021-149262

(51) Int. Cl.
*H04N 1/00* (2006.01)

(52) U.S. Cl.
CPC ..... *H04N 1/00567* (2013.01); *H04N 1/00408* (2013.01); *H04N 2201/0094* (2013.01)

(58) Field of Classification Search
CPC .......... B32B 2037/0061; B32B 43/006; B32B 37/185; B32B 37/0046; B32B 37/142; B32B 41/00; B32B 37/0053; B32B 37/18; B32B 2429/00; B32B 38/10; B32B 38/18; B32B 2309/72; B32B 37/02; B32B 38/14; B32B 38/1841; B32B 2309/70; B32B 38/1833; B65H 2801/27; B65H 5/301; B65H 5/305; B65H 3/06; B65H 29/125; B65H 3/36; B65H 45/04; B65H 45/16; B65H 5/06; B65H 3/0638; B65H 3/66; B65H 3/0669; B65H 2301/51122; B65H 2513/40; B65H 2513/42; B65H 7/02; B65H 2701/1131; B65H 2701/193; B65H 2801/03; B65H 29/22; B65H 5/062;
(Continued)

(56) References Cited

U.S. PATENT DOCUMENTS 6,023,313 A * 2/2000 Hazama ................ G02F 1/1333
349/158
6,335,722 B1 * 1/2002 Tani ...................... G06F 3/0481
348/208.1
(Continued)

FOREIGN PATENT DOCUMENTS

JP 5-338039 12/1993
JP 9-164593 6/1997
(Continued)

*Primary Examiner* — Negussie Worku
(74) *Attorney, Agent, or Firm* — IPUSA, PLLC

(57) ABSTRACT

An information processing system includes an information processing apparatus and an image forming apparatus. The information processing apparatus includes first circuitry to receive a designating operation for executing lamination processing, and transmit image data and designation data indicating that the designation operation for executing lamination processing has been received. The image forming apparatus includes second circuitry to receive the image data and the designation data, form an image on a recording medium based on the image data, and execute, in response to receiving the designation data, the lamination processing on the recording medium on which the image is formed with film.

5 Claims, 5 Drawing Sheets

(58) Field of Classification Search
CPC .......... B65H 7/06; B65H 2301/431715; B65H 2301/4318; B65H 2301/44338; B65H 2403/20; B65H 2403/41; B65H 2403/411; B65H 2403/512; B65H 2403/942; B65H 2404/632; B65H 2405/51; B65H 2405/581; B65H 2405/5812; B65H 2701/13214; B65H 39/043; B65H 5/30; G03G 15/2028; G03G 15/6585; G03G 15/6511; G03G 15/6588; G03G 2215/00476; G03G 15/6573; G03G 15/6582; G03G 2215/00523; B29C 63/0013; B29C 63/02; B29L 2031/767
USPC .................................................. 358/1.15, 1.1
See application file for complete search history.

(56) References Cited

U.S. PATENT DOCUMENTS

| | | | | |
|---|---|---|---|---|
| 8,059,982 | B2 * | 11/2011 | Carlson | G03G 15/2064 399/342 |
| 10,511,728 | B2 * | 12/2019 | Arakawa | G06F 40/18 |
| 2007/0115267 | A1 * | 5/2007 | Motoyoshi | H04N 1/00482 345/173 |
| 2009/0316201 | A1 * | 12/2009 | Nakai | H04N 1/00408 358/1.15 |
| 2018/0200949 | A1 * | 7/2018 | Isobe | B33Y 50/02 |
| 2020/0338877 | A1 * | 10/2020 | Takahashi | B65H 3/0638 |
| 2021/0281693 | A1 * | 9/2021 | Sato | H04N 1/00506 |
| 2021/0325804 | A1 * | 10/2021 | Furuhashi | B32B 43/006 |
| 2022/0011697 | A1 * | 1/2022 | Kimura | G03G 15/20 |
| 2022/0153008 | A1 * | 5/2022 | Takahashi | B32B 38/10 |
| 2022/0169458 | A1 * | 6/2022 | Suzuki | B32B 37/0053 |
| 2023/0060094 | A1 * | 2/2023 | Fukuchi | G06F 3/0486 |
| 2023/0083109 | A1 * | 3/2023 | Kitamura | H04N 1/00567 358/1.13 |
| 2023/0148080 | A1 * | 5/2023 | Sakurada | H04N 1/00474 358/3.28 |

FOREIGN PATENT DOCUMENTS

| | | |
|---|---|---|
| JP | 9-171278 | 6/1997 |
| JP | 2004-306445 | 11/2004 |
| JP | 2006-017752 | 1/2006 |
| JP | 2015-025908 | 2/2015 |
| JP | 2017-074693 | 4/2017 |
| JP | 2017-194636 | 10/2017 |
| JP | 2018-180400 | 11/2018 |
| JP | 2018-185379 | 11/2018 |
| JP | 2020-179584 | 11/2020 |

\* cited by examiner

INFORMATION PROCESSING SYSTEM, IMAGE FORMING APPARATUS, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-149262, filed on Sep. 14, 2021, in the Japan Patent Office, the entire disclosure of which is hereby incorporated by reference herein.

BACKGROUND

Technical Field

The present disclosure relates to an information processing system, an image forming apparatus, and a non-transitory recording medium.

Related Art

Information processing systems including an information processing apparatus and an image forming apparatus have been proposed in the art. In such information processing systems, image data is transmitted to the image forming apparatus from the information processing apparatus in response to an operation by a user. The image forming apparatus forms an image represented by the image data on a recording medium. Also, an image forming apparatus having a function to laminate film on a recording medium has been proposed in the art.

SUMMARY

In one aspect, an information processing system includes an information processing apparatus and an image forming apparatus. The information processing apparatus includes first circuitry to receive a designating operation for executing lamination processing and transmit image data and designation data indicating that the designation operation for executing lamination processing has been received. The image forming apparatus includes second circuitry to receive the image data and the designation data, form an image on a recording medium based on the image data, and execute, in response to receiving the designation data, the lamination processing on the recording medium on which the image is formed with film.

In another aspect, an image forming apparatus includes circuitry to receive, from an external information processing apparatus, image data and designation data indicating that a designating operation for executing lamination processing on a recording medium on which an image is to be formed based on the image data with film has been received, form the image on the recording medium based on the image data, and execute, in response to receiving the designation data, the lamination processing on the recording medium on which the image is formed.

In another aspect, a non-transitory recording medium stores a plurality of program codes which, when executed by one or more processors, causes the processors to perform a method. The method includes receiving a designation operation for executing lamination processing and transmitting, to an external image forming apparatus, image data representing an image and designation data indicating that the designating operation for executing the lamination processing has been received.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

Figure 1:
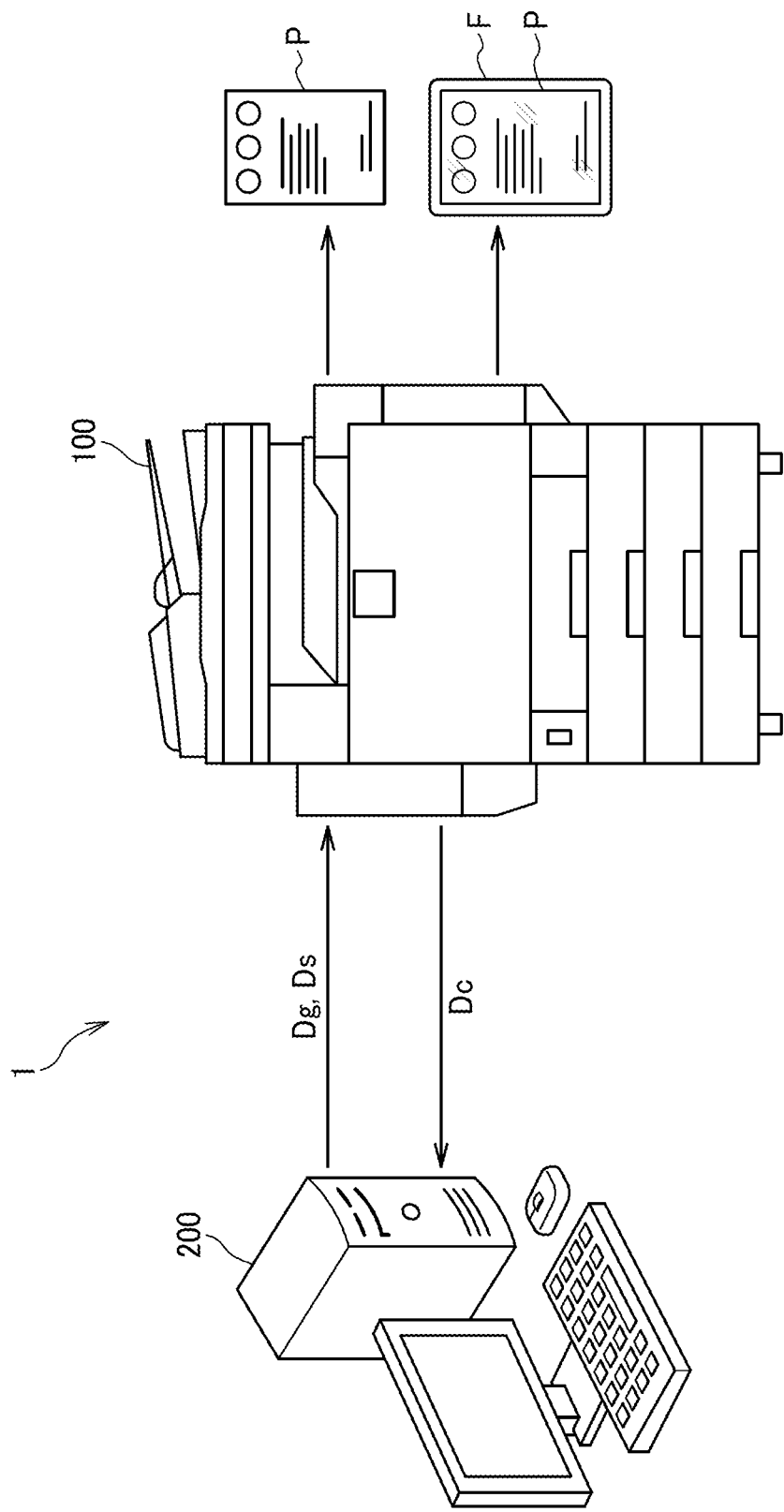
FIG. 1 is a schematic diagram illustrating an example of a configuration of an information processing system according to the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a schematic diagram illustrating an example of a configuration of an information processing system 1 according to the present embodiment. As illustrated in FIG. 1, the information processing system 1 includes a multi-function peripheral/product/printer (MFP) 100 that is an example of an image forming apparatus and a computer 200 that is an example of an information processing apparatus according to the present embodiment.

The MFP 100 and the computer 200 are communicably connected with each other via a network N. The network N may be, for example, any of the Internet, a dedicated network, a virtual private network (VPN), and a local network. In addition, the network N may be a combination of the above-described networks. Further, the network N may be either a wired network or a wireless network.

The MFP 100 has a printing function to form (print) an image on a print sheet P (an example of a recording medium). The MFP 100 has a laminating function in addition to the printing function. Specifically, the MFP 100 includes a laminator (see FIG. 2 to be described later) for laminating film F on the print sheet P on which the image is formed.

The film F is made of, for example, synthetic resins and is stored in the MFP 100. When the print sheet P sandwiched between the film F is pressurized while being heated, the film F and the print sheet P are bonded to each other (to execute lamination processing on the print sheet P with the film F).

The computer 200 includes a central processing unit (CPU), a read only memory (ROM), a random access memory (RAM), and a hard disk (HD) (see FIG. 3 to be described later). For example, a printer driver program is stored in the HD of the computer 200. When the printer driver program is executed, various operations for controlling the MFP 100 can be received by the computer 200. For example, when the printer driver program is executed, an operation for causing the MFP 100 to print an image (hereinafter referred to as a "printing execution operation") can be received by the computer 200.

In addition, an operation for designating execution (hereinafter referred to as a "designating operation") of the lamination processing can be received by the computer 200. (see FIGS. 5A to 5D to be described later). In response to receiving the designating operation for executing the lamination processing, the computer 200 transmits designation data Ds indicating that the designating operation for executing the lamination processing has been received to the MFP 100. On the other hand, when the designating operation for executing the lamination processing has not been received, the computer 200 transmits designation data Ds indicating that the designating operation for executing the lamination processing has not been received to the MFP 100. As illustrated in FIG. 1, image data Dg and the designation data Ds are transmitted to the MFP 100 from the computer 200 in response to the printing execution operation.

For example, it is assumed that the designation data Ds indicating that the designating operation for executing the lamination processing has been received and the image data Dg are received by the MFP 100. In this case, the MFP 100 prints an image represented by the image data Dg on the print sheet P and executes the lamination processing on the print sheet P. Further, it is assumed that the designation data Ds indicating that the designating operation for executing the lamination processing has not been received and the image data Dg are received by the MFP 100. In this case, the MFP 100 prints the image represented by the image data Dg on the print sheet P and does not execute the lamination processing on the print sheet P. The image data Dg is not limited to data in image format but may include codes.

As described above, the information processing system 1 of the present embodiment enables a user to perform an operation to designate whether or not to execute the lamination processing on the computer 200. This configuration has an advantage in enhancing operability for the user compared with, for example, a configuration in which the operation to designate whether or not to execute the lamination processing is performed only on the MFP 100. Note that a configuration in which the operation to designate whether or not to execute the lamination processing is performed on the MFP 100 may be adopted in the present embodiment in addition to the configuration in which the operation to designate whether or not to execute the lamination processing is performed on the computer 200.

However, depending on the type of print sheet (a shape such as a size and thickness, material), the lamination processing is inexecutable in some cases. Also, the MFP 100 may not have the laminating function in another case. In such cases, when the computer 200 receives the designating operation for executing the lamination processing, the MFP 100 cannot execute the lamination processing. To address such issues, in a case where the MFP 100 cannot execute the lamination processing, the computer 200 displays an image indicating that the lamination process is inexecutable, according to the configuration of the present embodiment.

Specifically, the computer 200 receives setting data Dc from the MFP 100 in advance. The setting data Dc includes information indicating whether the MFP 100 has a laminating function and information specifying the types of print sheet on which the MFP 100 can execute the lamination processing. The computer 200 determines whether the MFP 100 can execute the lamination processing based on the setting data Dc. In addition, the computer 200 displays an image from which a result of the determination is recognized (see FIG. 5D to be described later). Details of the configuration are to be described later.

Figure 2:
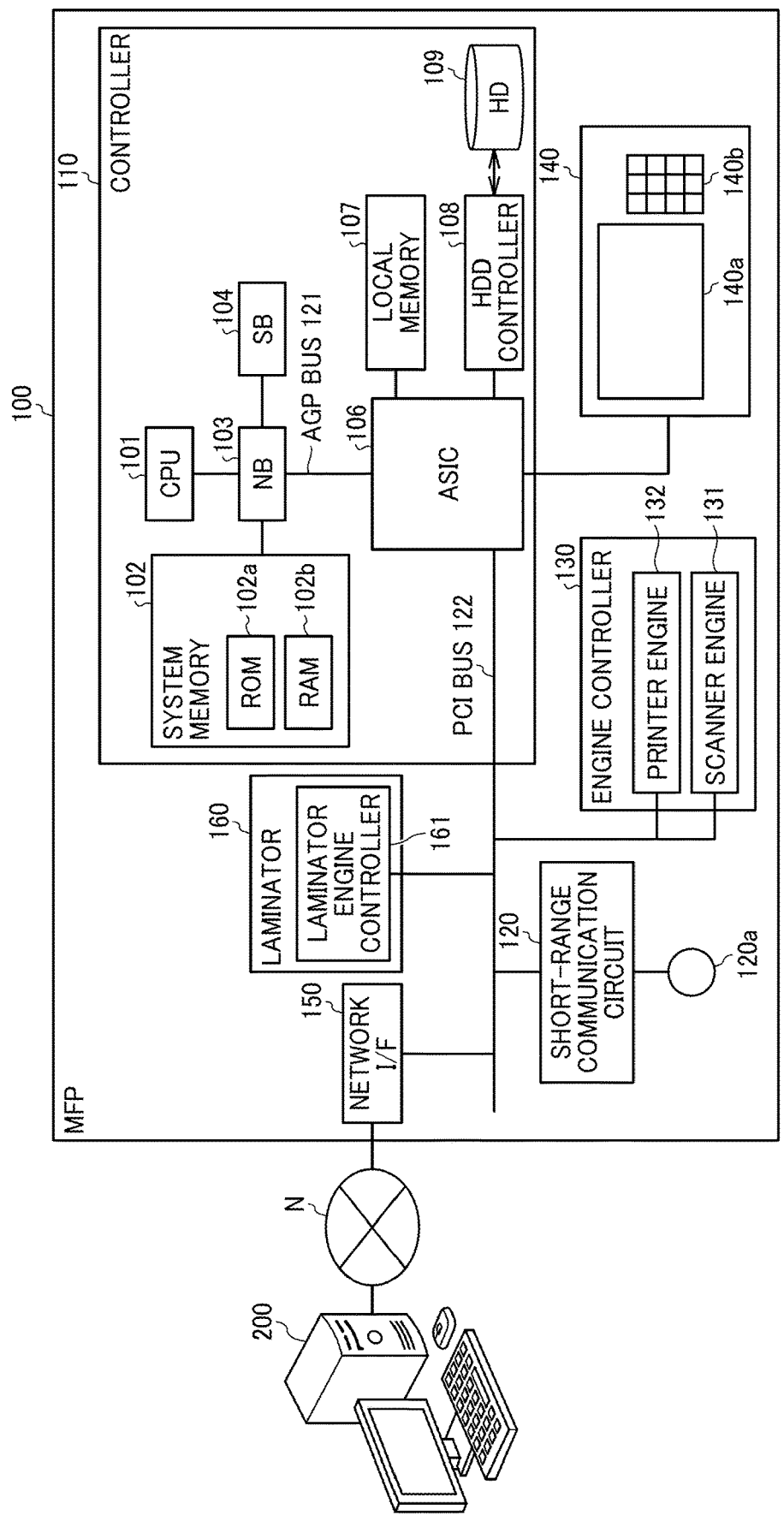
FIG. 2 is a block diagram illustrating an example of a hardware configuration of a multifunction peripheral (MFP) that is an example of an image forming apparatus according to the present disclosure.

FIG. 2 is a block diagram illustrating an example of a hardware configuration of the MFP 100 according to the present embodiment. As illustrated in FIG. 2, the MFP 100 includes a controller 110, a short-range communication circuit 120, an engine controller 130, a control panel 140, and a network interface (I/F) 150.

The controller 110 includes a CPU 101 as a main processor, a system memory 102, a north bridge (NB) 103, a south bridge (SB) 104, an application specific integrated circuit (ASIC) 106, a local memory 107 as a storage area, a hard disk drive (HDD) controller 108, and an HD 109 as a storage area. The NB 103 and the ASIC 106 are connected via an accelerated graphics port (AGP) bus 121.

The CPU 101 controls entire operation of the MFP 100. The NB 103 is a bridge for connecting the CPU 101 with the system memory 102, the SB 104, and the AGP bus 121. The NB 103 includes a memory controller for controlling reading and writing of various data from and to the system memory 102, a peripheral component interconnect (PCI) master, and an AGP target.

The system memory 102 includes a ROM 102a as a memory that stores a program and data for implementing various functions of the controller 110. The system memory 102 further includes a RAM 102b used as a memory to load the program and the data, or as a drawing memory that stores drawing data for printing. The program stored in the ROM 102a may be stored in any computer-readable recording medium, such as a compact disc read only memory (CD-ROM), a compact disc recordable (CD-R), or a digital versatile disc (DVD), in a file format installable or executable by a computer, for distribution.

The SB 104 is a bridge for connecting the NB 103 to a PCI device and a peripheral device. The ASIC 106 is an integrated circuit (IC) for image processing applications including hardware elements for image processing and has a role of a bridge connecting the AGP bus 121, a PCI bus 122, the HDD controller 108, and the local memory 107 one another.

The ASIC 106 includes a PCI target, an AGP master, an arbiter (ARB) as a central processor of the ASIC 106, a memory controller to control the local memory 107, a plurality of direct memory access controllers (DMACs), and a PCI unit. The DMACs rotate image data by converting coordinates of the image data with, for example, a hardware logic. The PCI unit transfers data between a scanner engine 131 and a printer engine 132 via the PCI bus 122. The ASIC 106 may be connected to a universal serial bus (USB) interface, the Institute of Electrical and Electronics Engineers 1394 (IEEE1394) interface, or both.

The local memory 107 is a local memory used as a copy image buffer and a code buffer. The HD 109 is a storage for storing image data, font data used during printing, and forms. The HDD controller 108 controls reading and writing of various data from and to the HD 109 under control of the CPU 101. The AGP bus 121 is a bus interface for a graphics accelerator card, which has been proposed to accelerate graphics processing. Through directly accessing the system memory 102 by high-throughput, speed of the graphics accelerator card is improved.

The short-range communication circuit 120 includes a short-range communication antenna 120a. The short-range communication circuit 120 is a communication circuit in compliance with the near field communication (NFC), BLUETOOTH, or the like. The engine controller 130 includes the scanner engine 131 and the printer engine 132.

The control panel 140 includes a panel display 140a and an operation panel 140b. The panel display 140a is, for example, a touch panel that displays current settings or a selection screen and receives a user input. The operation panel 140b includes, for example, a numeric keypad and a start key. The numeric keypad receives assigned values of image forming parameters such as an image density parameter. The start key receives an instruction to start copying, for example. The controller 110 controls entire operation of the MFP 100. For example, the controller 110 controls rendering, communication, and user inputs from the control panel 140. The scanner engine 131 or the printer engine 132 includes an image processing unit for error diffusion, gamma conversion, and the like.

The MFP 100 may sequentially switch to select a document server function, a copying function, a printing function, and a facsimile communication function by an application switching key of the control panel 140. When the document server function is selected, a document server mode is set, when the copying function is selected, a copy mode is set, when the printing function is selected, a printer mode is set, and when the facsimile communication function is selected, a facsimile mode is set.

The network I/F 150 is an interface for data communication through the network N. For example, the MFP 100 communicates with the computer 200 via the network N. The short-range communication circuit 120 and the network I/F 150 are electrically connected to the ASIC 106 via the PCI bus 122.

The MFP 100 includes a laminator 160 as illustrated in FIG. 2. The laminator 160 executes the lamination processing on a print sheet on which an image is printed by the printing function. Specifically, the laminator 160 includes a film storage in which the film F is stored, a conveyor that conveys the film F from the film storage, a mover that moves the print sheet P being sandwiched by the film F, and a pressure unit that heats and pressurizes the print sheet P sandwiched by the film F.

The pressure unit includes a heating roller including a heater. The heating roller is heated in advance when the lamination processing is executed. The heating roller is heated to a predetermined temperature in accordance with the type of film F, for example. The predetermined temperature is, for example, defined by a designer or a manufacturer. The laminator 160 includes a laminator engine controller 161. The laminator engine controller 161 controls each component (the conveyor, the mover, and the heating roller) of the laminator 160.

Figure 3:
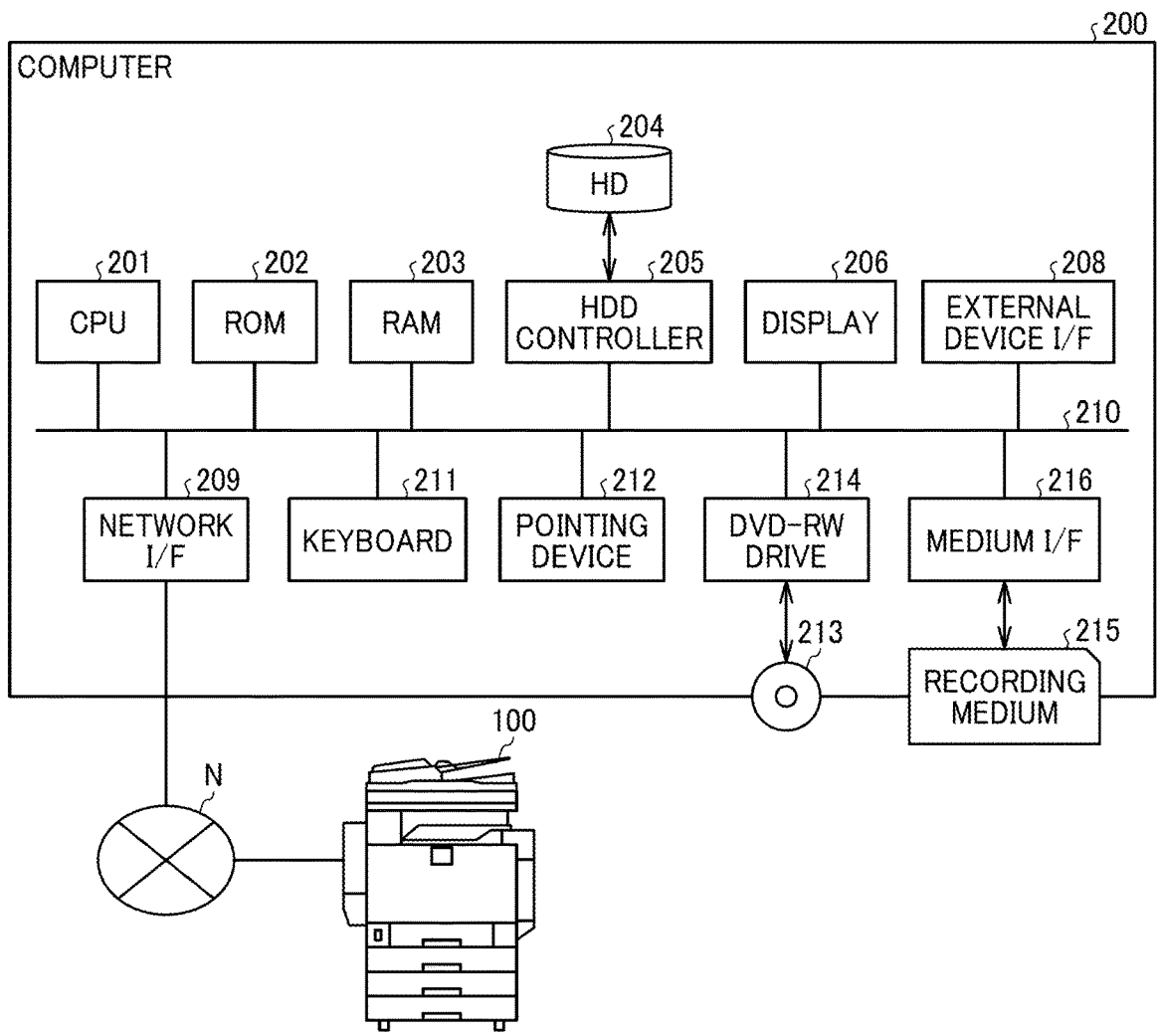
FIG. 3 is a block diagram illustrating an example of a hardware configuration of a computer that is an example of an information processing apparatus according to the present disclosure.

FIG. 3 is a block diagram illustrating an example of a hardware configuration of the computer 200 according to the present embodiment. As illustrated in FIG. 3, the computer 200 includes a CPU 201, a ROM 202, a RAM 203, an HD 204, an HDD controller 205, a display 206, an external device I/F 208, a network I/F 209, a data bus 210, a keyboard 211, a pointing device 212, a digital versatile disc rewritable (DVD-RW) drive 214, and a medium I/F 216.

The CPU 201 controls entire operation of the computer 200. The ROM 202 stores a program such as an initial program loader (IPL) used for driving the CPU 201. The RAM 203 is used as a work area for the CPU 201. The HD 204 stores various data such as a control program. The HDD controller 205 controls reading and writing of various data from and to the HD 204 under control of the CPU 201. The display 206 displays various information such as a cursor, a menu, a window, characters, and images.

The external device I/F 208 is an interface for connection with various external devices. Examples of the external devices include, but not limited to, a USB memory and a printer. The network I/F 209 is an interface for data communication through the network N. As described above, the computer 200 communicates with the MFP 100 via the network N. The data bus 210 is an address bus, a data bus, or the like that electrically connects each component illustrated in FIG. 3, such as the CPU 201.

The keyboard 211 is an example of an input device including a plurality of keys for inputting characters, numerical values, various instructions, and the like. The pointing device 212 is an example of an input device that allows a user to select or execute various instructions, select an object for processing, and move a cursor being displayed. The DVD-RW drive 214 controls reading and writing of various data from and to a DVD-RW 213, which is an example of a removable recording medium. The removable recording medium is not limited to a DVD-RW and may be a digital versatile disc recordable (DVD-R) or the like. The medium I/F 216 controls reading and writing (storing) of data from and to a recording medium 215 such as a flash memory.

Figure 4:
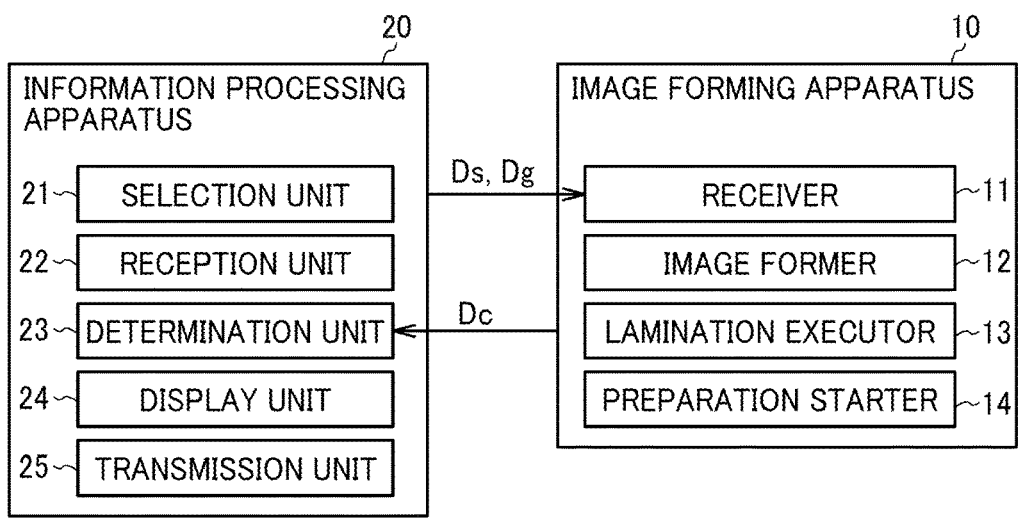
FIG. 4 is a block diagram illustrating an example of a functional configuration of the information processing system according to the present disclosure.

FIG. 4 is a block diagram illustrating an example of a functional configuration of the information processing system 1 according to the present embodiment. As illustrated in FIG. 4, the information processing system 1 includes an image forming apparatus 10 and an information processing apparatus 20. For example, the MFP 100 serves as the image forming apparatus 10 by the CPU 101 executing a program. Also, the computer 200 serves as the information processing apparatus 20 by the CPU 201 executing a program.

As illustrated in FIG. 4, the information processing apparatus 20 includes a selection unit 21, a reception unit 22, a determination unit 23, a display unit 24, and a transmission unit 25. The selection unit 21 of the information processing apparatus 20 receives a user operation for selecting a type of print sheet on which an image is to be formed. Specifically, the information processing apparatus 20 displays a setting screen image Gp to be described later (see FIGS. 5A to 5D). When one of the operation devices (e.g., the pointing device 212) of the information processing apparatus 20 is appropriately operated by a user during a period in which the setting screen image Gp is being displayed, the selection unit 21 selects the type of print sheet on which the image is to be formed. Hereinafter, for the sake of description, an operation for selecting a type of print sheet may be referred to as a "selecting operation."

The reception unit 22 of the information processing apparatus 20 receives a designating operation for executing the lamination processing. Specifically, when one of the operation devices (e.g., the pointing device 212) of the information processing apparatus 20 is appropriately operated by the user during a period in which the setting screen image Gp is being displayed, the reception unit 22 receives the designating operation for executing the lamination processing.

However, the film stored in advance in the image forming apparatus 10 restrict the types of print sheet on which the lamination processing is executable. In other words, depending on the type of print sheet selected by the information processing apparatus 20 (the selection unit 21), the lamination processing is inexecutable. To address such an issue, in a case where a print sheet on which the image forming apparatus 10 cannot execute the lamination processing is selected, the information processing apparatus 20 (the determination unit 23 and the display unit 24) according to the present embodiment allows the user to recognize that the lamination processing is inexecutable on the selected print sheet. A description is given of the above configuration below in detail.

The determination unit 23 of the information processing apparatus 20 determines whether the lamination processing is executable on the selected print sheet. Specifically, the information processing apparatus 20 (the determination unit 23) acquires the setting data Dc from the image forming apparatus 10. The setting data Dc specifies the types of print sheet on which the image forming apparatus 10 can execute the lamination processing. When the printer driver program is activated, the information processing apparatus 20 automatically acquires the setting data Dc. The information processing apparatus 20 determines whether the lamination processing is executable on the selected print sheet based on the setting data Dc. Note that a trigger to acquire the setting data Dc is not limited to the above-described example.

The display unit 24 of the information processing apparatus 20 displays on the display 206 an image from which a result determined by the determination unit 23 is recognized. Specifically, the information processing apparatus 20 (the display unit 24) displays the setting screen image Gp as described above on the display 206. The setting screen image Gp includes button images Ga to Gd to be described later. The button images Ga to Gd are displayed in different manners between a case where the lamination processing is determined to be executable (see FIG. 5B) and a case where the lamination processing is determined to be inexecutable (see FIG. 5D). In the present embodiment, in a case where a print sheet on which the image forming apparatus 10 cannot execute the lamination processing is selected, a designating operation for executing the lamination processing is unreceivable. A detailed description is given later.

The transmission unit 25 of the information processing apparatus 20 transmits the image data Dg representing an image and the designation data Ds indicating whether a designating operation for executing the lamination processing has been received. In response to receiving the image data Dg representing the image and the designation data Ds indicating that the designating operation for executing the lamination processing has been received, the image forming apparatus 10 executes the lamination processing on a print sheet on which the image is printed. A detailed description is given later. On the other hand, in response to receiving the image data Dg representing the image and the designation data Ds indicating that the designating operation for executing the lamination processing has not been received, the image forming apparatus 10 does not execute the lamination processing on a print sheet on which the image is printed.

As illustrated in FIG. 4, the image forming apparatus 10 includes a receiver 11, an image former 12, a lamination executor 13, and a preparation starter 14. The receiver 11 of the image forming apparatus 10 receives the image data Dg and the designation data Ds. As described above, the image data Dg and the designation data Ds are transmitted to the image forming apparatus 10 from the information processing apparatus 20. The image former 12 of the image forming apparatus 10 forms an image represented by the image data Dg on a print sheet. In a case where the receiver 11 receives the designation data Ds indicating that a designating operation for executing the lamination processing has been received, the lamination executor 13 of the image forming apparatus 10 executes the lamination processing on the print sheet on which the image is formed with the film.

In executing the lamination processing on a print sheet, the image forming apparatus 10 performs a preparatory operation determined in advance. Accordingly, a time for processing of the image forming apparatus 10 tends to be longer in a case of executing the lamination processing than in a case of not executing the lamination processing because of the time for the preparatory operation. To address such an issue, the image forming apparatus 10 of the present embodiment includes the preparation starter 14 that reduces the time in performing the processing. Note that the preparatory operation includes, for example, an operation for recovering the laminator 160 from a power saving state (sleep state) and is, for example, defined by a designer or a manufacturer.

Specifically, in a case where the receiver 11 receives the designation data Ds indicating that the designating operation for executing the lamination processing has been received, the preparation starter 14 starts the preparatory operation for enabling the lamination processing to be started before image forming processing is completed. Specifically, in the case where the receiver 11 receives the designation data Ds indicating that the designating operation for executing the lamination processing has been received, the image forming apparatus 10 (the preparation starter 14) transmits a signal for requesting preparation to the laminator 160. The signal for requesting preparation is transmitted to the laminator 160 before the image forming processing starts. In response to receiving the signal for requesting preparation, the laminator 160 recovers from the power saving state.

The time for the processing of the image forming apparatus 10 tends to be reduced in the configuration including the preparation starter 14 compared with a configuration in which the signal for requesting preparation is transmitted to the laminator 160 after the image forming processing is completed. Note that the preparatory operation performed by the image forming apparatus 10 is not limited to the above-described example. For example, when the signal for requesting preparation is transmitted to the laminator 160, the heater may start heating the heating roller. Further, when the signal for requesting preparation is transmitted to the laminator 160, the conveyor may start conveying the film to a position where the lamination processing is to be executed.

FIGS. 5A to 5D are schematic views of specific examples of the setting screen image Gp according to the present embodiment. When an operation for determining an image to be printed is received, the information processing apparatus 20 activates the printer driver program and displays the setting screen image Gp. Note that a trigger to start displaying the setting screen image Gp is changeable as appropriate.

Figure 5A:
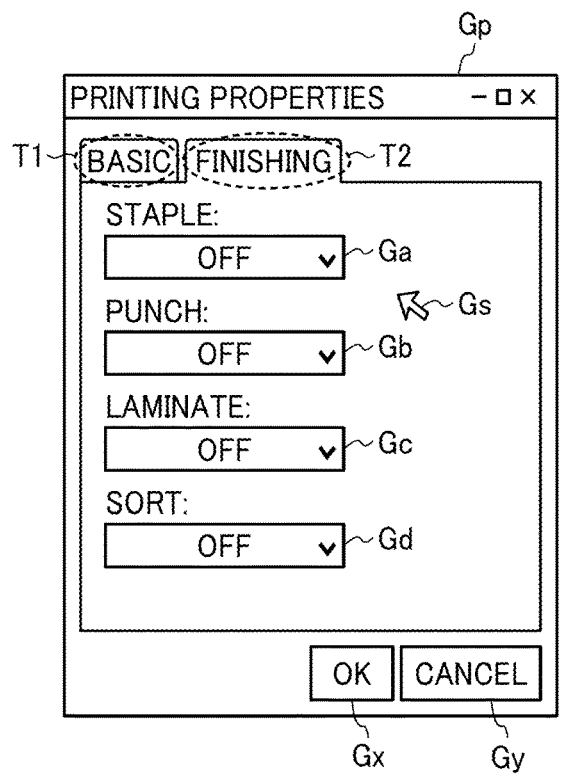
FIGS. 5A to 5D are schematic views of specific examples of a setting screen image according to the present disclosure.

As illustrated in FIG. 5A, the information processing apparatus 20 displays an indicator image Gs in addition to the setting screen image Gp. The indicator image Gs is moved and displayed in accordance with an operation of moving the pointing device 212 (e.g., a mouse). Hereinafter, for the sake of description, pressing a button of the pointing device 212 (clicking the mouse) in a state in which the indicator image Gs is positioned at a certain image may be simply referred to as "operating (to operate) a button image." Examples of the certain image are tags T1 and T2, the button images Ga to Gd, and button images Gx and Gy, which will be described later.

As illustrated in FIG. 5A, the setting screen image Gp includes the button image Gx for print and the button image Gy for cancellation. When the button image Gx for print is operated, the image data Dg is transmitted to the image forming apparatus 10, and an image represented by the image data Dg is printed. That is, the operation of the button image Gx for print is an example of the "printing execution operation." Note that the content of the printing execution operation may be changed as appropriate. In the present embodiment, the image forming apparatus 10 can print a plurality of images (pages) by a single printing execution operation. When the button image Gy for cancellation is operated, the execution of the printer driver program is stopped, and the printing of the image is cancelled.

As illustrated in FIG. 5A, the setting screen image Gp includes the tags T1 and T2. Although a detailed description is omitted, a selecting operation for selecting a type of print sheet can be performed when the tag T1 is operated. In addition, when the tag T1 is operated, various operations can be performed. Examples of the various operations include an operation to select whether to perform double-sided printing and/or N-up printing (printing multiple pages per sheet), and an operation to determine the number of copies to be printed. On the other hand, when the tag T2 is operated, an operation to designate execution of various types of finishing processing (including the lamination processing) can be performed.

FIGS. 5A to 5D are schematic views of specific examples of the setting screen image Gp when the tag T2 is operated. When the tag T2 is operated, the button images Ga to Gd are displayed on the setting screen image Gp. Each of the button images Ga to Gd corresponds to one type of finishing processing. The various types of finishing processing according to the present embodiment are staple processing, punch processing (punching holes), the lamination processing, and sort processing. Note that the types of finishing processing are not limited to the above-described examples.

For example, the button image Ga corresponds to the staple processing. Similarly, the button image Gb corresponds to the punch processing, the button image Gc corresponds to the lamination processing, and the button image Gd corresponds to the sort processing. Each of the button images Ga to Gd is operated by the indicator image Gs. When the user operates one of the button images Ga to Gd, the reception unit 22 receives a user selection of whether to execute the finishing processing corresponding to the one of the button images Ga to Gd.

Specifically, by appropriately operating one of the operation devices (e.g., the pointing device 212) of the information processing apparatus 20, each of the button images Ga to Gd is switched to either a state in which a character string "ON" is displayed (hereinafter referred to as a "designated state") or a state in which a character string "OFF" is displayed (hereinafter referred to as a "non-designated state"). A specific example of the operation for switching the state (the designated state or the non-designated state) of each of the button images Ga to Gd is described later with reference to FIG. 5B. When the button image Gx for print (the printing execution operation) is operated while one of the button images Ga to Gd is in the designated state, the finishing processing corresponding to the one of the button images Ga to Gd is executed by the image forming apparatus 10.

For example, all the button images Ga to Gd are in the non-designated state according to the specific example of FIG. 5A. Accordingly, no finishing processing is executed on a print sheet when the button image Gx for print is operated according to the specific example of FIG. 5A. As described above, that is, the operation of setting each of the button images Ga to Gd to the designated state is an operation for designating execution of the finishing processing corresponding to each of the button images Ga to Gd.

Figure 5B:
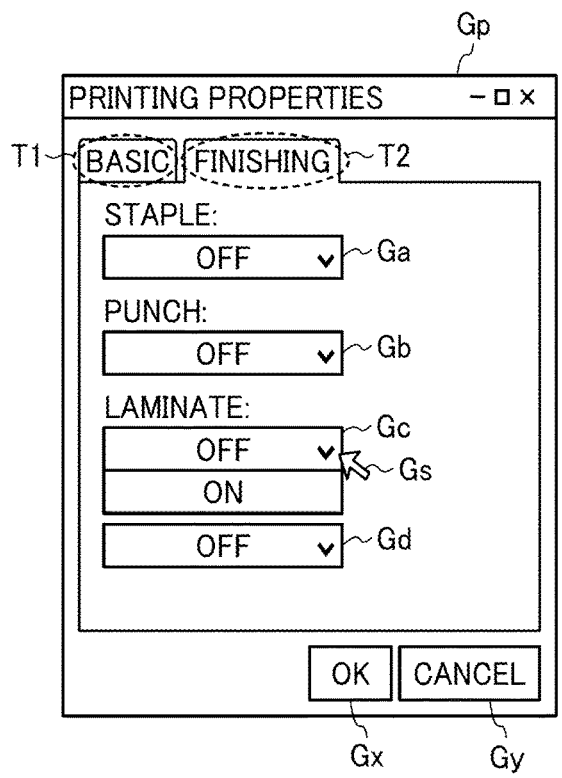

FIG. 5B is a schematic view of another specific example of the setting screen image Gp. The setting screen image Gp illustrated in FIG. 5B is to be displayed when the user performs a designating operation for executing the finishing processing. In the specific example of FIG. 5B, it is assumed that a designating operation for executing the lamination processing (an example of the designating operation) is performed among the various types of finishing processing.

As described above, each of the button images Ga to Gd is switched between the designated state and the non-designated state by being operated by the user in the present embodiment. That is, the user can switch whether to execute the finishing processing corresponding to each button image by operating each button image. Specifically, as illustrated in FIG. 5B, when the button image Gc is operated, sections displaying the character strings "ON" and "OFF" are displayed at positions corresponding to the button image Gc. In the specific example of FIG. 5B, a state in which immediately after the button image Gc is operated is assumed. In this case, the two sections described above are displayed at the positions corresponding to the button image Gc. Thereafter, when the section displaying the character string "ON" at the position corresponding to the button image Gc is operated (an example of the designating operation), the button image Gc is set to the designated state. On the other hand, when the section displaying the character string "OFF" at the position corresponding to the button image Gc is operated, the button image Gc is set to the non-designated state. The states of the other button images (Ga, Gb, and Gd) are also switched between the designated state and the non-designated state in the same procedure as that of the button image Gc. Note that the content of the designating operation is not limited to the above-described examples.

However, depending on the type of finishing processing, one type of finishing processing is not simultaneously executed with another type of finishing processing. For example, the image forming apparatus 10 may be designed not to execute the staple processing on a print sheet on which the lamination processing has been executed since the print sheet is protected by film. Similarly, the image forming apparatus 10 may be designed not to execute the punch processing on a print sheet on which the lamination processing has been executed. To address such an issue, when a designating operation for executing one type of finishing processing is received, the information processing apparatus 20 does not receive a designating operation for executing another type of finishing processing that is not simultaneously executable with the already-designated finishing processing in the present embodiment. A description is given of the above configuration with reference to FIG. 5C.

Figure 5C:
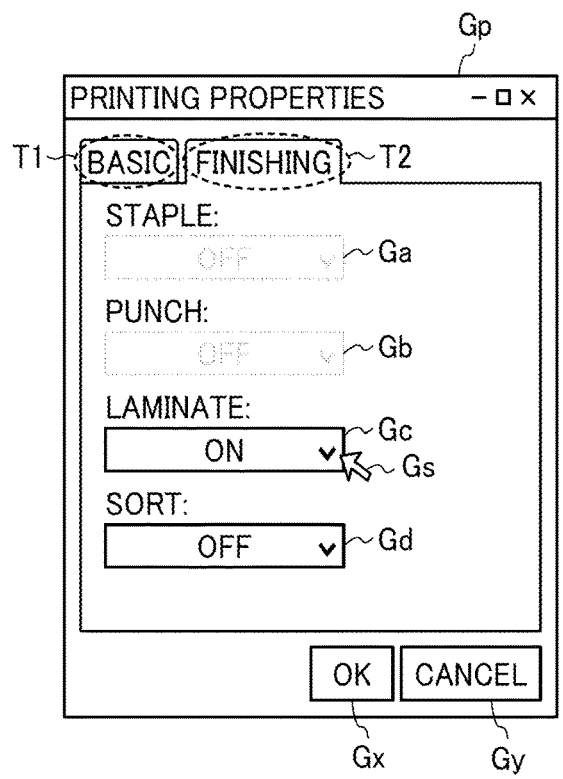

FIG. 5C is a schematic view of still another specific example of the setting screen image Gp. In the specific example of FIG. 5C, a period in which a designating operation for executing some types of finishing processing are unreceivable is assumed. Specifically, it is assumed that a designating operation for executing the lamination processing is performed among the various types of finishing processing in FIG. 5C. In such a case, neither a designating operation for executing the staple processing nor a designating operation for executing the punch processing is unreceivable.

When a designating operation for executing a type of finishing processing corresponding to one of the button images is unreceivable, the one of the button images remains in the non-designated state in which the one of the button images is inoperable. As illustrated in FIG. 5C, the inoperable button images (Ga and Gb in the example of FIG. 5C) are displayed in a manner distinguishable from the operable button images (Gc and Gd in the example of FIG. 5C), for example, in a grayed-out manner. The above-described configuration has an advantage that a type of inexecutable finishing processing is intuitively recognized.

When the button image Gc corresponding to the lamination processing is switched to the non-designated state from the designated state, the button image Ga corresponding to the staple processing and the button image Gb corresponding to the punch processing change to be operable. Alternatively, in a case where the button image Ga corresponding to the staple processing is switched to the designated state, the button image Gc corresponding to the lamination processing may change to be inoperable. That is, when the designating operation for executing the staple processing is received, the designating operation for executing the lamination processing is disabled. Similarly, in a case where a designating operation for executing the punch processing is received, the designating operation for executing the lamination processing may be disabled.

The above-described configuration eliminates an inconvenience that, when executing one type of finishing processing is designated, executing another type of finishing processing that is not simultaneously executable with the already-designated finishing processing is designated. However, the types of film available for the lamination processing are restricted by the types of film set in advance in the image forming apparatus 10. In addition, depending on the type of print sheet, the lamination processing is inexecutable even with the available film. Accordingly, depending on the type of print sheet on which an image is printed, the lamination processing is inexecutable regardless of whether or not executing another type of finishing processing is designated. To address such an issue, when a type of print sheet on which the lamination processing is inexecutable is selected, an image indicating that the lamination processing is inexecutable is displayed in the present embodiment. A description is given of the above configuration with reference to FIG. 5D.

Figure 5D:
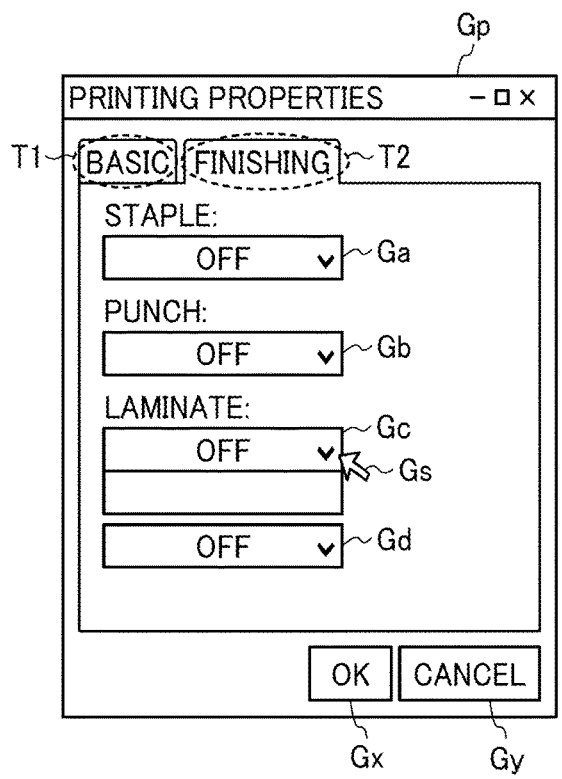

FIG. 5D is a schematic view of still another specific example of the setting screen 5 image Gp. In the specific example illustrated in FIG. 5D, it is assumed that a type of print sheet on which the lamination processing is inexecutable is selected. As described above in FIG. 5B, in response to the operation of the button image Gc, the two sections are displayed at the positions corresponding to the button image Gc in a case where the lamination processing is executable. The character string "ON" is displayed in one of the two sections. In addition, in a case where the lamination processing is executable and the section indicating the character string "ON" at the position corresponding to the button image Gc is operated, the button image Gc is set to the designated state. Thus, a designating operation for executing the lamination processing is performed.

As illustrated in FIG. 5D, when the button image Gc is operated during a period in which the lamination processing is inexecutable, the two sections are displayed at the positions corresponding to the button image Gc in the same manner as in the period in which the lamination processing is executable. However, the character string "OFF" is displayed in one of the two sections, but no other character string is displayed in the other section where the character string "ON" is supposed to be originally displayed.

In the above-described configuration, the button image Gc is displayed in different manners depending on whether the lamination processing is executable or inexecutable. Accordingly, a user can recognize whether the lamination processing is executable from the manner in which the button image Gc is displayed. Note that, as for the sections of the button image Gc, a section in which no character string is displayed is inoperable. That is, when the lamination processing is inexecutable, the button image Gc cannot be set to the designated state. In other words, the designating operation for executing the lamination processing is inoperable during the period in which the lamination processing is inexecutable according to the above-described configuration.

In a certain case, the image forming apparatus 10 may not have the laminating function. In such a case, the lamination processing is inexecutable regardless of the type of print sheet to be selected. To address such an issue, in a case where the image forming apparatus 10 does not have the laminating function, the button image Gc is displayed in the manner illustrated in FIG. 5D regardless of the type of the selected print sheet according to the present embodiment. Note that, in a case where the image forming apparatus 10 has the laminating function but a type of print sheet on which the lamination processing is inexecutable is selected, a message indicating that the lamination processing is executable on another type of print sheet may be displayed.

Figure 6:
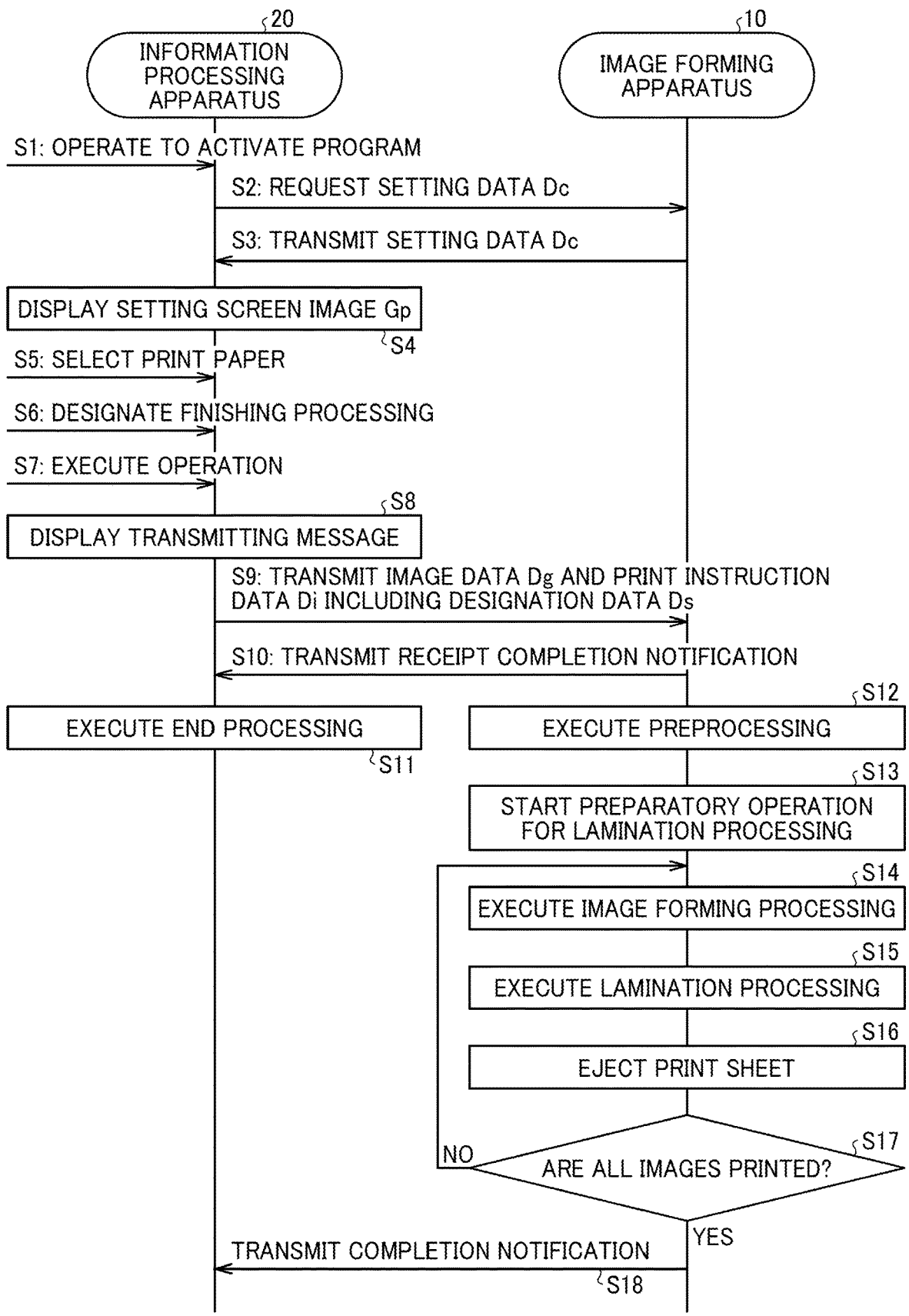
FIG. 6 is a sequence chart illustrating an example of processing performed by the information processing system according to the present disclosure.

FIG. 6 is a sequence chart illustrating a specific example of processing performed by the information processing system 1 according to the present embodiment. As illustrated in FIG. 6, the information processing apparatus 20 receives an operation for activating the printer driver program from a user in S1. When the printer driver program is activated, the information processing apparatus 20 requests the setting data Dc from the image forming apparatus 10 in S2. As described above, the setting data Dc is stored in advance in the image forming apparatus 10. The setting data Dc includes various kinds of information such as information indicating whether the image forming apparatus 10 has the laminating function, and information specifying the types of print sheet on which the lamination processing is executable when the image forming apparatus 10 has the laminating function.

In response to the request from the information processing apparatus 20, the image forming apparatus 10 transmits the setting data Dc to the information processing apparatus 20 in S3. In receiving the setting data Dc, the information processing apparatus 20 displays the setting screen image Gp in S4. The processing of S2 to S4 are automatically performed when the information processing apparatus 20 receives the operation for activating the printer driver program.

As described above, the information processing apparatus 20 receives a selecting operation for selecting a type of print sheet during a period in which the setting screen image Gp is being displayed. The information processing apparatus 20 receives the selecting operation for selecting a type of print sheet on which the lamination processing is executable in S5. Further, the information processing apparatus 20 receives a designating operation for executing the lamination processing during a period in which the setting screen image Gp is being displayed. The information processing apparatus 20 receives the designating operation for executing the lamination processing in S6.

When the information processing apparatus 20 receives a printing execution operation (an operation of the button image Gx for print illustrated in FIG. 5A) from the user in S7, the information processing apparatus 20 starts displaying an image representing transmission in S8. The image representing the transmission is, for example, a message that various kinds of information (e.g., the image data Dg and print instruction data Di) are being transmitted to the image forming apparatus 10. After starting to display the image representing the transmission, the information processing apparatus 20 transmits the image data Dg and the print instruction data Di (job information) to the image forming apparatus 10 in S9. The print instruction data Di includes, for example, information indicating the type of print sheet selected by the selecting operation and the designation data Ds indicating whether the designating operation for executing the lamination processing has been received.

After receiving the image data Dg and the print instruction data Di, the image forming apparatus 10 transmits a reception completion notification to the information processing apparatus 20 in S10. In response to receiving the reception completion notification, the information processing apparatus 20 executes end processing in S11. The end processing includes, for example, processing to stop displaying the image representing the transmission started to be displayed in S8 described above.

Further, in response to receiving the image data Dg and the print instruction data Di, the image forming apparatus 10 executes preprocessing in S12. The preprocessing is processing to be executed in advance for image forming processing to be described later. For example, the preprocessing includes storing the image data Dg received in the processing of S9 in a storage determined in advance (e.g., the HD 109). In addition, the preprocessing includes analyzing the designation data Ds included in the print instruction data Di received in the processing of S9. Specifically, the image forming apparatus 10 determines whether the designating operation for executing the lamination processing has been received by the information processing apparatus 20 based on the designation data Ds.

In a case where the image forming apparatus 10 determines that the designating operation for executing the lamination processing has been received by the information processing apparatus 20 in the preprocessing, the image forming apparatus 10 starts the preparatory operation for executing the lamination processing in S13. As described above, the preparatory operation includes the operation for recovering the laminator 160 from the power saving state (the sleep state). In a case where the image forming apparatus 10 determines that the designating operation for executing the lamination processing has not been received by the information processing apparatus 20 in the preprocessing, the image forming apparatus 10 omits the processing of S13.

After starting the preparatory operation, the image forming apparatus 10 executes the image forming processing in S14. In the image forming processing, the image forming apparatus 10 acquires the image data Dg stored in the storage in the preprocessing and forms an image represented by the image data Dg on a print sheet. Thereafter, in S15, the image forming apparatus 10 executes the lamination processing on the print sheet on which the image is formed in the image forming processing. In a case where the image forming apparatus 10 determines that the designating operation for executing the lamination processing has not been received by the information processing apparatus 20 in the preprocessing, the image forming apparatus 10 omits the processing of S15.

The image forming apparatus 10 executes the lamination processing on the print sheet and then ejects the print sheet to the outside in S16. Further, the image forming apparatus 10 determines whether all the images (pages) instructed to be printed have been printed in S17. In a case where the image forming apparatus 10 determines that all the images instructed to be printed have been printed (YES in S17), the image forming apparatus 10 transmits a completion notification to the information processing apparatus 20 in S18. On the other hand, in a case where the image forming apparatus 10 determines that not all the images instructed to be printed have been printed yet (NO in S17), the image forming apparatus 10 repeats the processing of S14 to S17.

Note that the apparatus that executes each unit of the above processing may be appropriately changed. Each of the functions of the above-described embodiment may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

First Aspect

An information processing system (e.g., the information processing system 1) according to a first aspect includes an information processing apparatus (e.g., the information processing apparatus 20) and an image forming apparatus (e.g., the image forming apparatus 10). The information processing apparatus includes a reception unit (e.g., the reception unit 22) that receives a designating operation for executing lamination processing and a transmission unit (e.g., the transmission unit 25) that transmits image data (e.g., the image data Dg) representing an image and designation data (e.g., the designation data Ds) indicating that the designating operation for executing the lamination processing has been received. The image forming apparatus includes a receiver (e.g., the receiver 11) that receives the image data and the designation data, an image former (e.g., the image former 12) that forms an image represented by the image data on a recording medium, and a lamination executor (e.g., the lamination executor 13) that executes, in response to receiving the designation data indicating that the designating operation for executing the lamination processing has been received, the lamination processing on the recording medium on which the image is formed with film. The present aspect enables a user to perform the designating operation for executing the lamination processing on the information processing apparatus.

Second Aspect

In the information processing system according to a second aspect, the image forming apparatus includes a preparation starter (e.g., the preparation starter 14) that starts, in response to receiving the designation data, a preparatory operation for the lamination processing before image forming processing is completed. According to the present aspect, a time for completing the processing of the image forming apparatus 10 tends to be reduced in the configuration including the preparation starter compared with a configuration in which the preparatory operation starts after the image forming processing is completed.

Third Aspect

In the information processing system according to a third aspect, the information processing apparatus includes a selection unit (e.g., the selection unit 21) that receives selection of a type of recording medium on which the image is to be formed, a determination unit (e.g., the determination unit 23) that determines whether the lamination processing is executable on the type of recording medium selected by the selection unit, and a display unit (e.g., the display unit 24) that displays on a display an image (e.g., the button image Gc illustrated in FIG. 5D) from which a result determined by the determination unit is recognized. According to the present aspect, in a case where the lamination processing is inexecutable, a user can recognize in advance that the lamination processing is inexecutable.

Fourth Aspect

The image forming apparatus according to a fourth aspect includes the receiver that receives, from an external information processing apparatus, the image data representing the image and the designation data indicating that the designating operation for executing the lamination processing on the recording medium on which the image represented by the image data is formed with the film has been received, the image former that forms the image represented by the image data on the recording medium, and the lamination executor that executes, in response to receiving the designation data, the lamination processing on the recording medium on which the image is formed with the film. According to the present aspect, the same effect as in the first aspect is obtained.

Fifth Aspect

A non-transitory recording medium according to a fifth aspect stores a plurality of program codes which, when executed by one or more processors, causes the processors to perform a method. The method includes receiving the designating operation for executing the lamination processing (S6 in FIG. 6) and transmitting, to an external image forming apparatus, the image data representing the image and the designation data indicating that the designating operation for executing the lamination processing has been received (S9 in FIG. 6). According to the present aspect, the same effect as in the first aspect is obtained.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising an information processing apparatus and an image forming apparatus,
   the information processing apparatus including first circuitry configured to:
   receive setting data from the image forming apparatus, the setting data including at least information indicating whether the image forming apparatus is able to execute lamination processing;
   display a print setting screen on a display, the print setting screen configured to receive a designation operation for executing the lamination processing when the setting data indicates that the image forming apparatus is able to execute lamination processing, and wherein the print setting screen is unable to receive the designation operation when the setting data indicates that the image forming apparatus is unable to execute the lamination processing;
   in response to receiving the designation operation for executing the lamination processing, transmit, to the image forming apparatus, image data and designation data for executing the lamination processing,
   the image forming apparatus including second circuitry configured to:
   receive, from the information processing apparatus, the image data and the designation data;
   form an image on a recording medium based on the image data; and
   after the image is formed on the recording medium, execute, based on the designation data, the lamination processing on the recording medium on which the image is formed,
   wherein executing the lamination processing comprises laminating the recording medium with film.

2. The information processing system according to claim 1, wherein:
   the second circuitry of the image forming apparatus is further configured to start, in response to receiving the designation data, a preparatory operation for the lamination processing before image forming processing is completed.

3. The information processing system according to claim 1, wherein:
   the first circuitry of the information processing apparatus is further configured to:
   receive second information when the setting data indicates that the image forming apparatus is able to execute the lamination processing, wherein the second information specifies types of recording media on which the lamination processing is executable;

receive a selection of a type of recording medium on which the image is to be formed; and determine whether the selected type of recording medium matches at least one type of recording medium specified in the second information, and wherein the print setting screen is unable to receive the designation operation for executing the lamination processing when the selected type of recording medium does not match at least one type of recording medium specified in the second information.

4. A non-transitory recording medium storing a plurality of program codes which, when executed by one or more processors, causes the processors to perform a method, the method comprising:

receiving, at an information processing apparatus, setting data from an image forming apparatus, the setting data including at least information indicating whether the image forming apparatus is able to execute lamination processing;

displaying, at a display, a print setting screen, the print setting screen configured to receive a designation operation for executing the lamination processing when the setting data indicates that the image forming apparatus is able to execute lamination processing, and wherein the print setting screen is unable to receive the designation operation when the setting data indicates that the image forming apparatus is unable to execute lamination processing;

in response to receiving the designation operation for executing the lamination processing, transmitting, to the image forming apparatus, image data representing an image and designation data for executing the lamination processing, forming, by the image forming apparatus, an image on a recording medium based on the image data, and after the image is formed on the recording medium, execute, based on the designation data, the lamination processing on the recording medium on which the image is formed, wherein executing the lamination processing comprises laminating the recording medium with film.

5. An information processing apparatus, including first circuitry configured to:

receive setting data from an image forming apparatus, the setting data including at least information indicating whether the image forming apparatus is able to execute lamination processing;

display a print setting screen on a display, the print setting screen configured to receive a designation operation for executing the lamination processing when the setting data indicates that the image forming apparatus is able to execute lamination processing, and wherein the print setting screen is unable to receive the designation operation when the setting data indicates that the image forming apparatus is unable to execute the lamination processing;

in response to receiving the designation operation for executing the lamination processing, transmit, to the image forming apparatus, image data and designation data for executing the lamination processing.

* * * * *